US012807408B2

(12) United States Patent
Austrheim

(10) Patent No.: US 12,807,408 B2
(45) Date of Patent: Nov. 24, 2026

(54) HATCH ASSEMBLY FOR A PORT OF A STORAGE AND RETRIEVAL SYSTEM

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 302 days.

(21) Appl. No.: 18/695,190

(22) PCT Filed: Sep. 16, 2022

(86) PCT No.: PCT/EP2022/075845
§ 371 (c)(1),
(2) Date: Mar. 25, 2024

(87) PCT Pub. No.: WO2023/052158
PCT Pub. Date: Apr. 6, 2023

(65) Prior Publication Data
US 2024/0392620 A1 Nov. 28, 2024

(30) Foreign Application Priority Data
Sep. 29, 2021 (NO) .................................... 20211162

(51) Int. Cl.
*B65G 1/04* (2006.01)

(52) U.S. Cl.
CPC .................................. *B65G 1/0464* (2013.01)

(58) Field of Classification Search
CPC .......................... B65G 1/0485; B65G 2207/40
See application file for complete search history.

(56) References Cited

U.S. PATENT DOCUMENTS 5,141,380 A * 8/1992 Kato .................... B65G 1/0421 414/281
5,687,858 A * 11/1997 Bouche ................ B65G 1/0485 414/280

(Continued)

FOREIGN PATENT DOCUMENTS

CN 109205158 A 1/2019
CN 111899419 A 11/2020

(Continued)

OTHER PUBLICATIONS

International Search Report issued in corresponding International Application No. PCT/EP2022/075845, mailed on Dec. 16, 2022 (4 pages).

(Continued)

*Primary Examiner* — Jonathan Snelting
(74) *Attorney, Agent, or Firm* — Baker Botts L.L.P.

(57) ABSTRACT

A hatch assembly includes a pivotable hatch, at least one driven arm, and at least one link. The pivotable hatch includes a hatch frame pivotable about a horizontal pivot axis at its base, and a hatch cover connected to the hatch frame. The hatch cover can move in an arcuate manner for covering an open side of the goods holder. The driven arm rigidly is connected to a drive shaft. The link is for linking the pivotable hatch frame and the driven arm so that motion of the driven arm causes pivoting motion of the hatch. The link has a first direction of extension and is rigidly connected to the hatch frame and flexibly connected to the driven arm. The link has variable length in the first direction of extension. The length of the link is reduced once a forward pivotal movement of the hatch frame is discontinued.

21 Claims, 7 Drawing Sheets

(56) References Cited

U.S. PATENT DOCUMENTS

| | | | | |
|---|---|---|---|---|
| 6,056,134 | A * | 5/2000 | Katzenschwanz | B65G 1/0435 414/280 |
| 6,840,400 | B2 * | 1/2005 | Park | G07F 19/20 221/12 |
| 9,147,303 | B2 * | 9/2015 | Loignon | G07F 11/24 |
| 10,913,607 | B2 * | 2/2021 | Hognaland | B65G 1/0464 |
| 11,138,544 | B2 * | 10/2021 | Kütt | G07F 17/13 |
| 11,222,499 | B2 * | 1/2022 | Mason | G07F 11/005 |
| 11,254,516 | B1 * | 2/2022 | Rahman | B65G 11/023 |
| 11,267,651 | B2 * | 3/2022 | Fosnight | B65G 1/0492 |
| 11,505,198 | B2 * | 11/2022 | Austrheim | B65G 1/0414 |
| 2003/0111478 | A1 | 6/2003 | Park | |

FOREIGN PATENT DOCUMENTS

| | | | |
|---|---|---|---|
| CN | 112193695 | A | 1/2021 |
| FR | 2 723 574 | A1 | 2/1996 |
| NO | 317366 | B1 | 10/2004 |
| WO | 2014/075937 | A1 | 5/2014 |
| WO | 2014/090684 | A1 | 6/2014 |
| WO | 2015/193287 | A1 | 12/2015 |
| WO | 2018/146304 | A1 | 8/2018 |
| WO | 2019/206487 | A1 | 10/2019 |
| WO | 2020/074717 | A1 | 4/2020 |
| WO | 2020/094604 | A1 | 5/2020 |

OTHER PUBLICATIONS

Written Opinion issued in corresponding International Application No. PCT/EP2022/075845, mailed on Dec. 16, 2022 (7 pages).
Examination Report issued in counterpart Norwegian Patent Application No. 20211162 mailed on Apr. 29, 2022 (4 pages).
Search Report issued in counterpart Norwegian Patent Application No. 20211162 mailed on Apr. 29, 2022 (2 pages).
Schneider, Marc, Office Action in EP22773746.7, mailed Feb. 19, 2026, 5 pages, European Patent Office, Munich, Germany.

* cited by examiner

HATCH ASSEMBLY FOR A PORT OF A STORAGE AND RETRIEVAL SYSTEM

The present invention relates to a hatch assembly for a port of a storage and retrieval system.

BACKGROUND AND PRIOR ART

FIG. 1 discloses a prior art automated storage and retrieval system 1 with a framework structure 100 and FIGS. 2, 3*a*-3*b* disclose three different prior art container handling vehicles 201, 301, 401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form container stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 301, 401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 301, 401 in a first direction X across the top of the frame structure 100, and a second set of parallel rails 111 arranged perpendicular to the first set of rails 110 to guide movement of the container handling vehicles 301, 401 in a second direction Y which is perpendicular to the first direction X. Containers 106 stored in the columns 105 are accessed by the container handling vehicles 301, 401 through access openings 112 in the rail system 108. The container handling vehicles 301, 401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201, 301, 401 comprises a vehicle body 201*a*, 301*a*, 401*a* and first and second sets of wheels 201*b*, 201*c*, 301*b*, 301*c*, 401*b*, 401*c* which enable lateral movement of the container handling vehicles 201, 301, 401 in the X direction and in the Y direction, respectively. In FIGS. 2-3*b*, two wheels in each set are fully visible. The first set of wheels 201*b*, 301*b*, 401*b* is arranged to engage with two adjacent rails of the first set 110 of rails, and the second set of wheels 201*c*, 301*c*, 401*c* is arranged to engage with two adjacent rails of the second set 111 of rails. At least one of the sets of wheels 201*b*, 201*c*, 301*b*, 301*c*, 401*b*, 401*c* can be lifted and lowered, so that the first set of wheels 201*b*, 301*b*, 401*b* and/or the second set of wheels 201*c*, 301*c*, 401*c* can be engaged with the respective set of rails 110, 111 at any one time.

Each prior art container handling vehicle 201, 301, 401 also comprises a lifting device 304, 404 (visible in FIGS. 3*a*-3*b*) having a lifting frame part 304*a*, 404*a* for vertical transportation of storage containers 106, e.g. raising a storage container 106 from, and lowering a storage container 106 into, a storage column 105. The lifting device 304, 404 comprises one or more gripping/engaging devices which are adapted to engage a storage container 106, and which gripping/engaging devices can be lowered from the vehicle 201, 301, 401 so that the position of the gripping/engaging devices with respect to the vehicle 201, 301, 401 can be adjusted in a third direction Z (visible for instance in FIG. 1) which is orthogonal the first direction X and the second direction Y. Parts of the gripping device of the container handling vehicles 301, 401 are shown in FIGS. 3*a* and 3*b* indicated with reference number. The gripping device of the container handling device 201 is located within the vehicle body 201*a* in FIG. 2.

Conventionally, and also for the purpose of this application, Z=1 identifies the uppermost layer available for storage containers below the rails 110, 111, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=18, Y=1, Z=6. The container handling vehicles 201, 301, 401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201, 301, 401 comprises a storage compartment or space for receiving and stowing a storage container 106 when transporting the storage container 106 across the rail system 108. The storage space may comprise a cavity arranged internally within the vehicle body 201*a* as shown in FIGS. 2 and 3*b* and as described in e.g. WO2015/193278A1 and WO2019/206487A1, the contents of which are incorporated herein by reference.

FIG. 3*a* shows an alternative configuration of a container handling vehicle 301 with a cantilever construction. Such a vehicle is described in detail in e.g. NO317366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIG. 3*b* and as disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks; in other rail systems 108, each rail in one direction may comprise one track and each rail in the other perpendicular direction may comprise two tracks. The rail system may also comprise a double track rail in one of the X or Y direction and a single track rail in the other of the X or Y direction. A double track rail may comprise two rail members, each with a track, which are fastened together.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201, 301, 401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or a dedicated column 105 within the framework structure 100, then picked up by any container handling vehicle and transported to a port column 119, 120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201, 301 can drop off storage containers 106 to be transported to an access or a transfer station, and the second port column 120 may be a dedicated pick-up port column where the container handling vehicles 201, 301, 401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are, once accessed, returned into the framework structure 100. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different heights, the conveyor system may comprise a lift device with a vertical component for transporting the storage containers 106 vertically between the port column 119, 120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201, 301, 401 is instructed to retrieve the target storage container 106 from its position and transport it to the drop-off port column 119. This operation involves moving the container handling vehicle 201, 301 to a location above the storage column 105 in which the target storage container 106 is positioned, retrieving the storage container 106 from the storage column 105 using the container handling vehicle's 201, 301, 401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201, 301, 401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301, 401 is instructed to pick up the storage container 106 from the pick-up port column 120 and transport it to a location above the storage column 105 where it is to be stored. After storage containers 106 positioned at or above the target position within the stack 107 have been removed, the container handling vehicle 201, 301, 401 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106 and the movement of the container handling vehicles 201, 301, 401 so that a desired storage container 106 can be delivered to the desired location at the desired time without the container handling vehicles 201, 301, 401 colliding with each other, the automated storage and retrieval system 1 comprises a control system 500 (shown in FIG. 1) which typically is computerized and which typically comprises a database for keeping track of the storage containers 106.

In a conventional storage and retrieval storage system, such as that shown in FIG. 1, storage containers exit the system via ports. In this context, conveyor ports are frequently used. These are very simple in design and normally lack safety mechanisms altogether.

Port designs with safety mechanisms are also available, such as swing ports and carousel ports, both types being characterized by a relatively large footprint and structural complexity.

Ports belonging to state of the art are disclosed in WO2020/074717A1 and WO2020/094604A1.

Regardless of the port type, a container handling vehicle typically places a container in the back of a port whereupon the container is transferred to the front position of the port where the operator can access the items inside the container.

In many port designs, the container, when arriving to the front position of the port, is, for safety reasons, initially shielded from the operator by a protective guard device. In order to access the items inside the container, at least a cover of this protective guard device first needs to be moved backward. Here, every movement of the guard cover potentially represents a safety risk for the operator. In particular, the operator risks getting his fingers pinched at some point in subsequent forward motion of said guard cover.

Current solutions for avoiding these situations involve systems for close monitoring of the torque associated with the motor driving the protective guard. More specifically, movement of the hatch is driven by a toothed belt driven, in turn, by said motor. When the torque value generated by the motor exceeds a predetermined value, the motor comes to a halt and the movement of the hatch is discontinued. If the system for monitoring torque value fails to perform adequately or breaks down altogether, then the prohibitively high torque value might pass undetected resulting in an operator sustaining an injury, his fingers could for instance get pinched by the guard cover.

In view of all of the above, it is desirable to provide a solution that solves or at least mitigates one or more of the aforementioned problems belonging to the prior art.

SUMMARY OF THE INVENTION

The present invention is set forth and characterized in the independent claim, while the dependent claims describe other characteristics of the invention.

Invention relates to a hatch assembly for a port of a storage and retrieval system for storing goods holders, said hatch assembly comprising:

- a pivotable hatch comprising a hatch frame pivotable about a horizontal pivot axis at its base, and a hatch cover connected to the hatch frame, wherein said hatch cover can move in an arcuate manner for covering an open side of the goods holder,
- at least one driven arm rigidly connected to a drive shaft of driving means,
- at least one link for linking the pivotable hatch frame and the driven arm so that motion of the driven arm causes pivoting motion of the hatch, the link having a first direction of extension, said link being rigidly connected to the hatch frame and flexibly connected to the driven arm, wherein
- said link has variable length in the first direction of extension, and wherein
- length of the link is reduced once a forward pivotal movement of the hatch frame is discontinued.

By providing a hatch assembly as defined above, a solution that eliminates the risk of fingers being pinched by a moving hatch cover is obtained. This is achieved in a simple and robust manner, i.e. without relying on electronic torque measurement components and software. More specifically, if forward, i.e. towards the operator, movement of the hatch cover suddenly becomes hindered by the operator's hand, the driven arm will continue to pivot and the link being flexibly connected to the driven arm and having variable length will be compressed, i.e. its length will be reduced. In consequence, a forward pivotal movement of the hatch frame is discontinued. Accordingly, the hatch cover stays put and does not move forward.

In addition, the hatch assembly of the present invention has a simple design based on pivoting parts and featuring a limited number of components, resulting in a small footprint. In consequence, the port including the safety hatch also assumes a smaller footprint. This entails that more ports may be fitted in the available space.

In a related context, the hatch assembly of the present invention combines the small footprint with state-of-the-art safety mechanism. Accordingly, it may be used in a number of different port applications, including applications in pick-up areas where the goods holder is directly handled by a customer.

For the sake of brevity, advantages discussed above in connection with the hatch assembly may even be associated with the method for controlling operation of the hatch assembly and are not further discussed.

For the purposes of this application, the term "container handling vehicle" used in "Background and Prior Art"-section of the application and the term "remotely operated vehicle" used in "Detailed Description of the Invention"-section both define a robotic wheeled vehicle operating on a rail system arranged across the top of the framework structure being part of an automated storage and retrieval system.

Analogously, the term "storage container" used in "Background and Prior Art"-section of the application and the term "goods holder" used in "Detailed Description of the Invention"-section both define a receptacle for storing items. In this context, the goods holder can be a bin, a tote, a pallet, a tray or similar. Different types of goods holders may be used in the same automated storage and retrieval system.

The relative terms "upper", "lower", "below", "above", "higher" etc. shall be understood in their normal sense and as seen in a Cartesian coordinate system. When mentioned in relation to a rail system, "upper" or "above" shall be understood as a position closer to the surface rail system (relative to another component), contrary to the terms "lower" or "below" which shall be understood as a position further away from the rail system (relative another component).

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
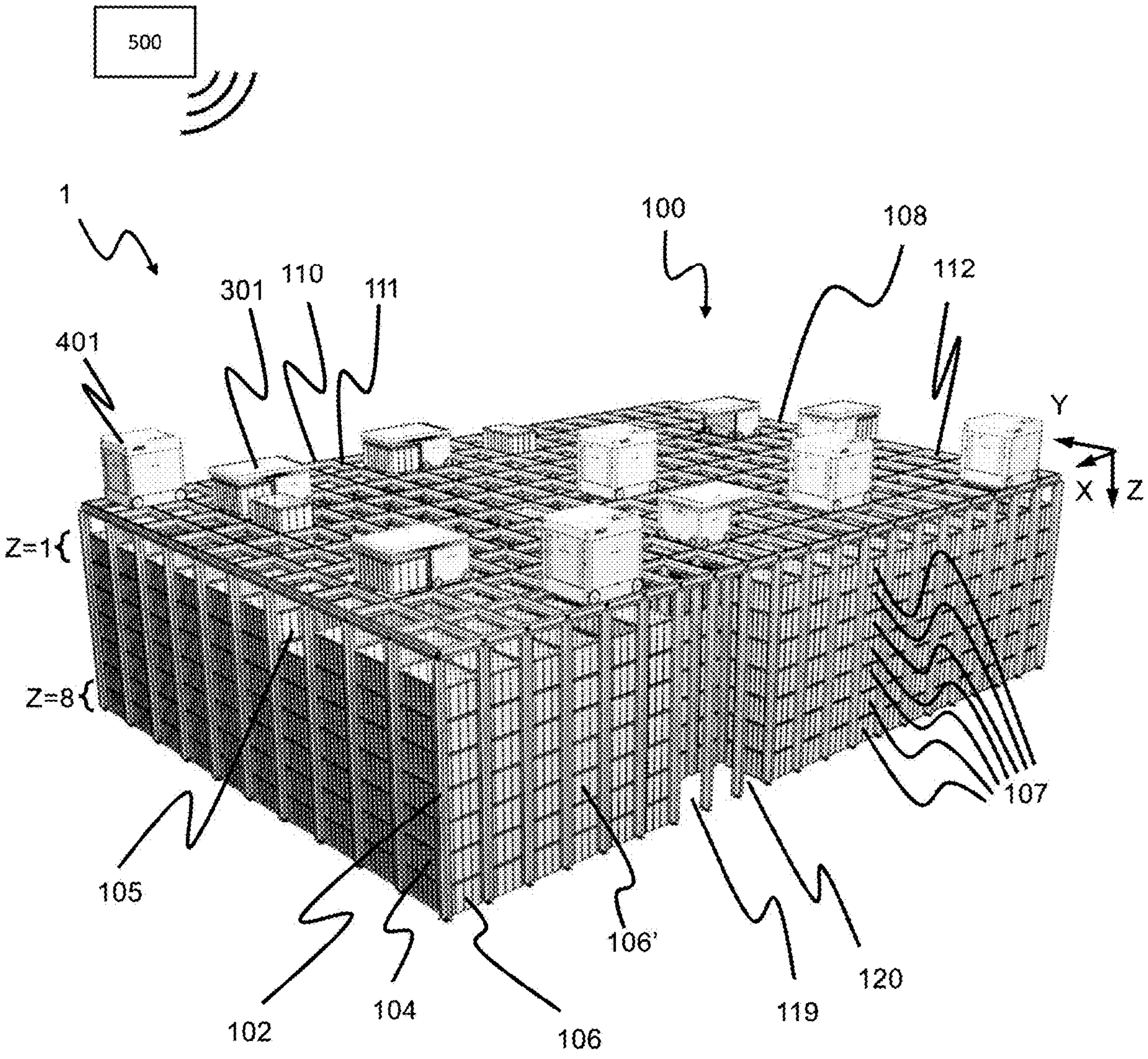
Fig. 1 (Prior Art)
FIG. 1 is a perspective view of a framework structure of an automated storage and retrieval system belonging to prior art.
Figure 2:
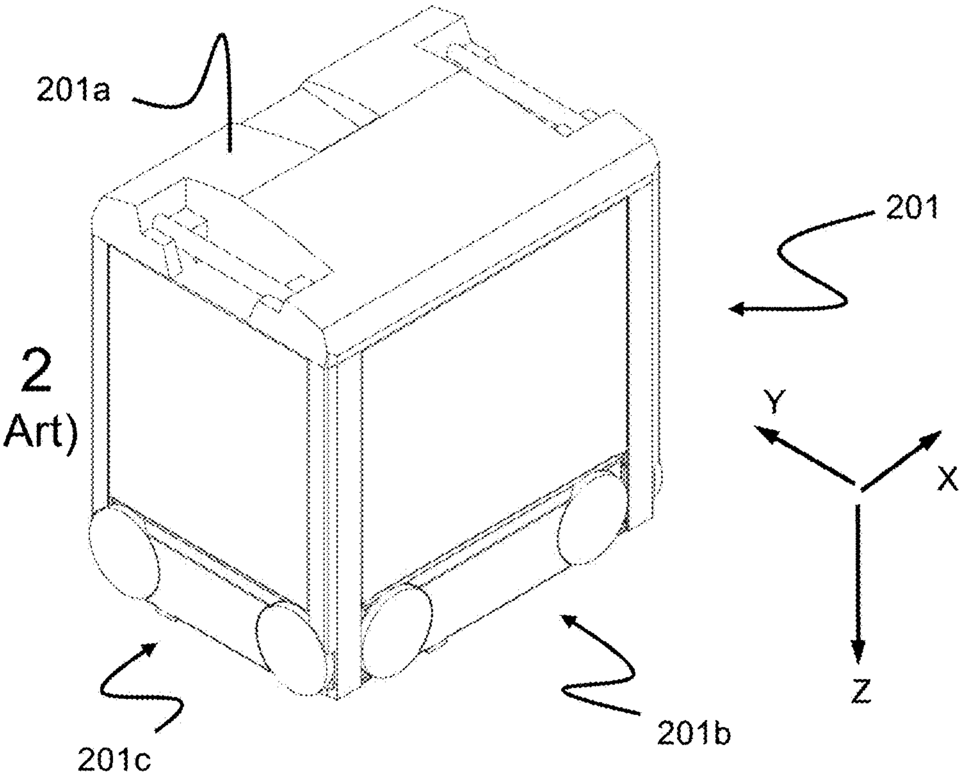
Fig. 2 (Prior Art)
FIG. 2 is a perspective view of a prior art container handling vehicle having a centrally arranged cavity for carrying a container therein.
Figure 3A:
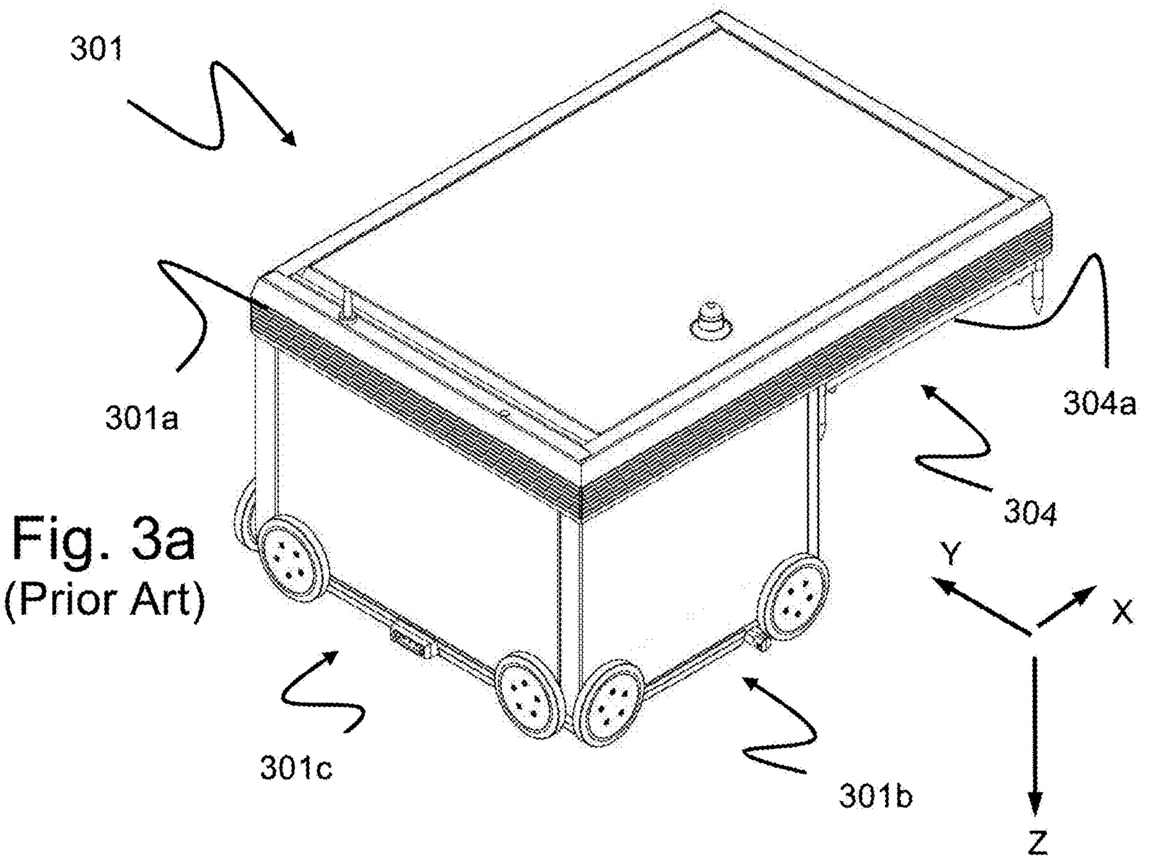
Fig. 3a (Prior Art)
FIG. 3*a* is a perspective view of a prior art container handling vehicle having a cantilever for carrying storage containers underneath.
Figure 3B:
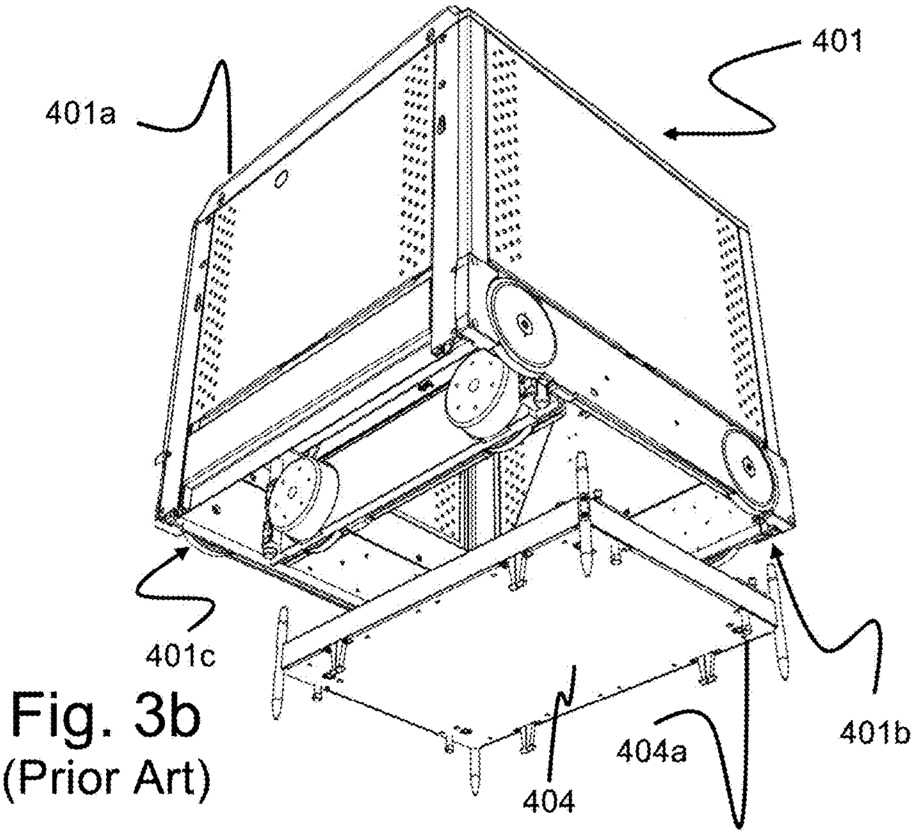
Fig. 3b (Prior Art)
FIG. 3*b* is a perspective view, seen from below, of a prior art container handling vehicle having an internally arranged cavity for carrying a storage container therein.

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-3*b*, i.e. a number of upright members 102, wherein the framework structure 100 also comprises a first, upper rail system 108 in the X direction and Y direction.

The framework structure 100 further comprises storage compartments in the form of storage columns 105 provided between the members 102 where storage containers 106 are stackable in stacks 107 within the storage columns 105.

The framework structure 100 can be of any size. In particular, it is understood that the framework structure can be considerably wider and/or longer and/or deeper than disclosed in FIG. 1. For example, the framework structure 100 may have a horizontal extent of more than 700×700 columns and a storage depth of more than twelve containers.

Various aspects of the present invention will now be discussed in more detail with reference to FIGS. 4-8.

Figure 4:
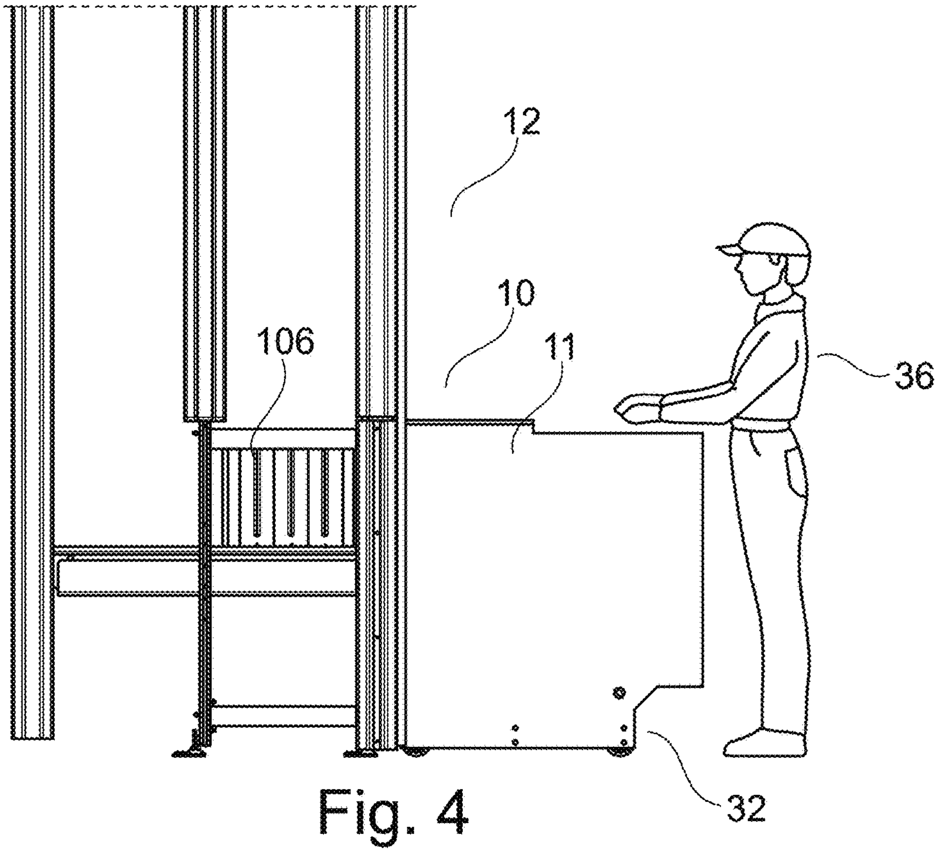
FIG. 4 is a perspective side view showing port and a port operator in accordance with one embodiment of the present invention.

FIG. 4 is a perspective side view showing a port 12 and a port operator 36 of a storage and retrieval system shown in FIG. 1 in accordance with one embodiment of the present invention. A goods holder 106 about to exit the system via said port 12 is also shown. A hatch assembly 10 provided with a side cover 11 is also shown. The shown hatch assembly 10 is substantially shaped as a parallelepiped. A cut-out 32 that faces the operator 36 is provided at a lowermost portion of the hatch assembly 10. The assembly 10 will be discussed in greater detail in connection with FIGS. 5-8.

Figure 5:
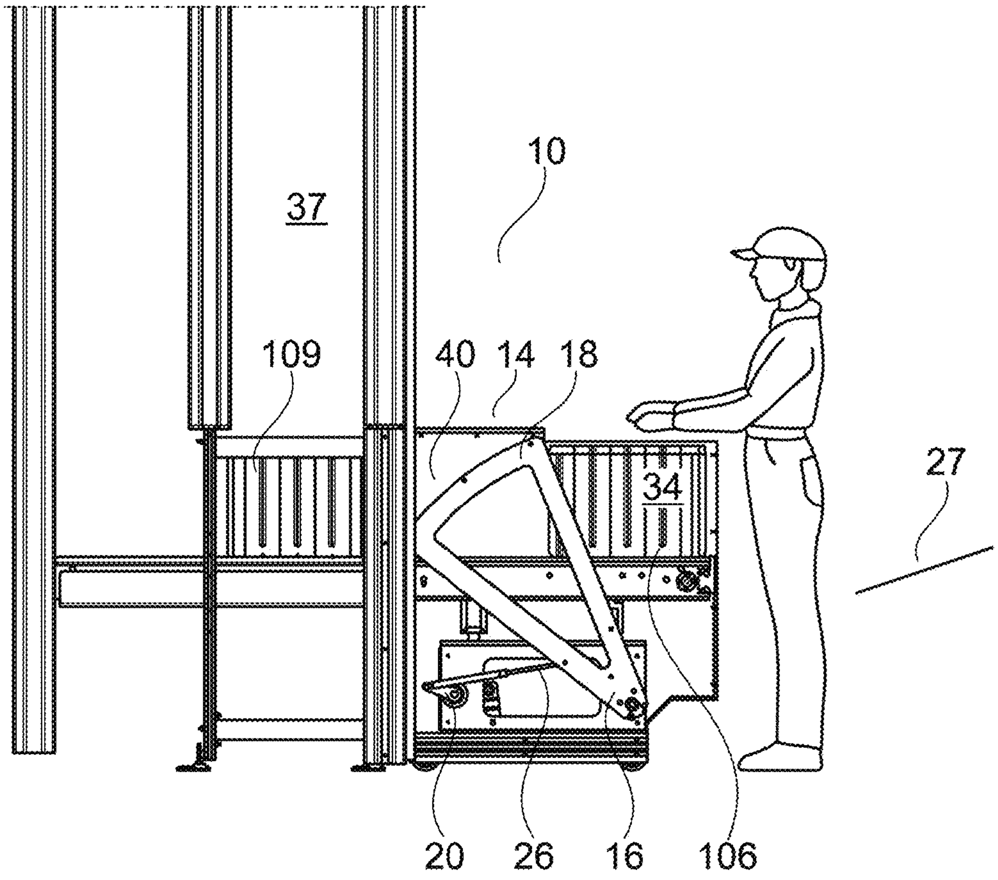
FIG. 5 is a perspective side view of a hatch assembly in accordance with one embodiment of the present invention, wherein lid part of the hatch assembly is open.

FIG. 5 is a perspective side view of a hatch assembly 10 in accordance with one embodiment of the present invention. For the sake of brevity, the parts discussed above in connection with FIG. 4 are not further discussed in connection with FIG. 5. Side cover shown in FIG. 4 has been removed in order to show interior components of the hatch assembly 10. In FIG. 5, a hatch cover 18 of the hatch assembly 10 is in the open state and goods holder 106 is in its access position 34. The hatch cover 18 has curved shape having a first curvature.

The shown hatch assembly 10 is suitable for use in a port of a storage and retrieval system for storing goods holders. The hatch assembly 10 comprises a pivotable hatch 14 comprising a hatch frame 16 pivotable about a horizontal pivot axis at its base, and the hatch cover 18 rigidly connected to the hatch frame 16. A further goods holder 109 positioned in a port column 37 is also shown. The hatch cover 18 can move in an arcuate manner for covering an open side of the goods holder 106. At least one driven arm 20 is rigidly connected to a drive shaft of driving means (both shown and discussed in connection with FIG. 8). At least one link 26 links the pivotable hatch frame 16 and the driven arm 20 so that motion of the driven arm 20 causes pivoting motion of the hatch 14. The driven arm 20 and the pivotable hatch frame 16 pivot back and forth in a reciprocative manner in the same plane. Said arm 20 and the hatch frame 16 always pivot in the same direction. An angular stroke of the driven arm 20 is between 80 and 100 degrees. Here, angular stroke of the driven arm 20 is the angular length of the arm movement required to cover over or allow access to the goods holder 106. The angular stroke of the driven arm 20 is larger than an angular stroke of the pivotable hatch frame 16.

The link 26 has a first direction of extension 27 and is rigidly connected to the hatch frame 16 and flexibly, typically pivotally, connected to the driven arm 20. The link 26 has variable length in the first direction of extension 27. In one embodiment, said link 26 comprises a spring that optionally may be lockable. The spring could be a gas spring. A threshold value for a force required to compress the gas spring, a so-called push-in force, is in the range 50-150 Nm.

Figure 6:
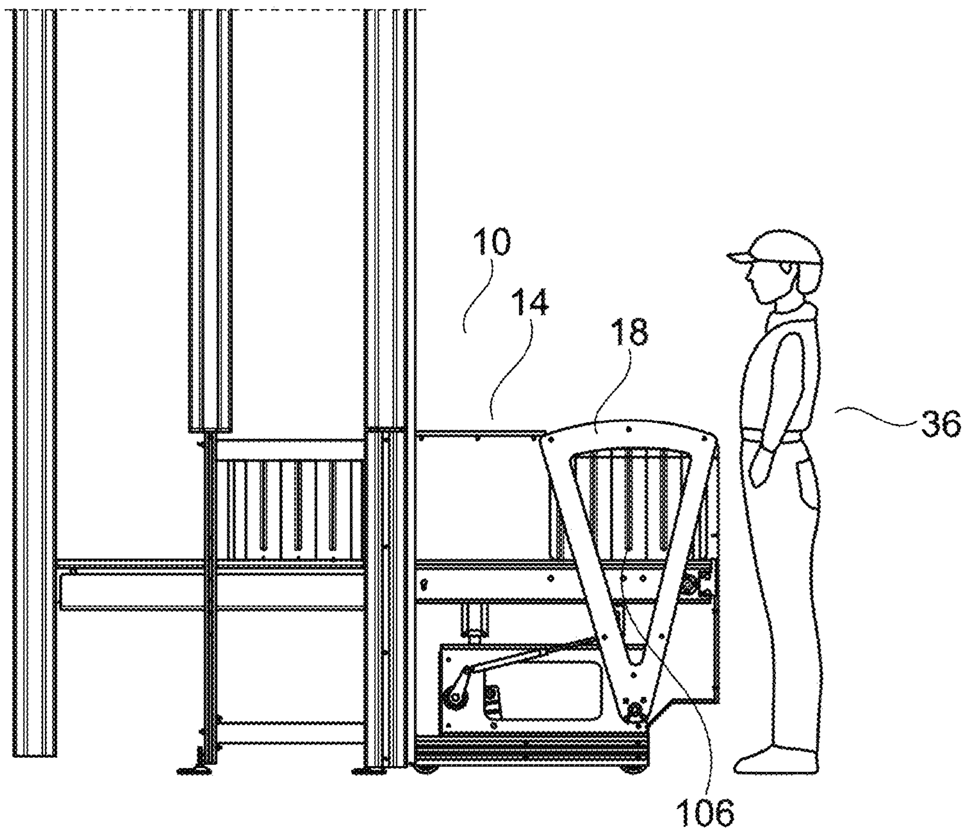
FIG. 6 is a perspective side view of the hatch assembly shown in FIG. 5, wherein lid part of the hatch assembly is closed.

FIG. 6 is a perspective side view of the hatch assembly 10 shown in FIG. 5. In FIG. 6, a hatch cover 18 of the hatch assembly 10 is in the closed state and the operator 36, in particular his hands, is positioned at a distance from the hatch assembly 10.

With reference to FIGS. 5-6 and for safety purposes, the hatch cover 18 will always be in closed state when the hatch assembly 10 doesn't hold a goods holder.

Furthermore, arrival of the goods holder 106 into access position associated with the goods holder (34; shown in FIG. 5) is detected by a suitable sensor, for instance a weight sensor. This sensor sends a signal to a control unit (not shown) that hatch 14 needs to open, i.e. pivot back into position shown in FIG. 5 such that the content of the goods holder may be accessed by the operator. The control unit may be independent or be integrated into a larger control unit controlling operation of the entire system of FIG. 1. Once the goods holder 106 is emptied and is ready for return to the system, the entire hatch 14 pivots forward so that the hatch cover 18 may shield the empty goods holder. This action may be triggered by the sensor signal or by the operator's action(s). In a related context, the hatch assembly 10 may be provided with a sensor (not shown) for monitoring position of the hatch cover 18.

Figure 7:
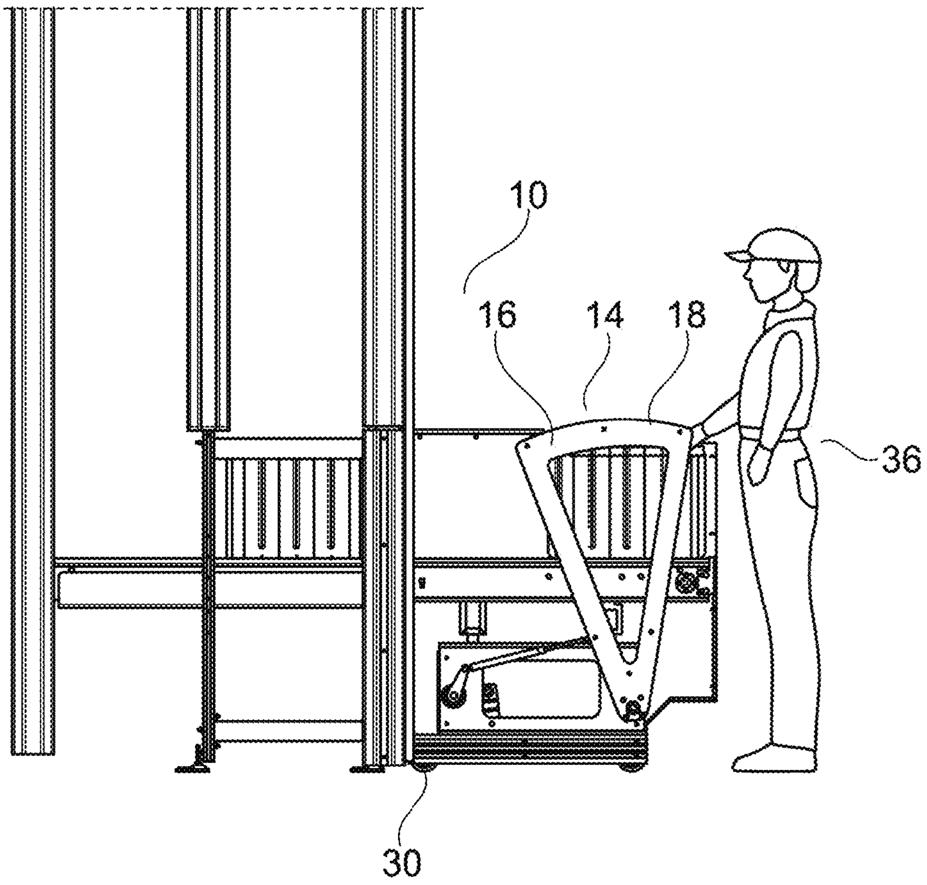
FIG. 7 is a perspective side view of the hatch assembly shown in FIGS. 5 and 6, wherein operator's hand is caught by the lid part.

FIG. 7 is a perspective side view of the hatch assembly 10 including a hatch 14 shown in FIGS. 5 and 6, wherein operator's 36 hand is caught by the hatch cover 18. For the sake of brevity, the parts discussed above in connection with FIGS. 5 and 6 are not further discussed in connection with FIG. 7.

In addition to what has been stated in connection with FIGS. 5-6, the hatch assembly 10 of FIGS. 5-7 eliminates the risk of fingers caught by the moving hatch cover 18 being firmly squeezed by the cover 18 such that the operator 36 sustains a serious injury. This is achieved in a simple and robust manner, i.e. without relying on electronic torque measurement components and software. More specifically, if forward, i.e. towards the operator 36, movement of the hatch cover 18 suddenly becomes hindered by the operator's hand, the driven arm will continue to pivot and the link being flexibly connected to the driven arm and having variable length will give in and compress, i.e. its length will be reduced, while a forward pivotal movement of the hatch frame 16 and the hatch cover 18 will be discontinued. In consequence, the hatch cover 18 stays put and does not move forward and cannot inflict an injury to the operator 36.

Here, the hatch assembly 10 of FIGS. 5-7 combines the small footprint with state-of-the-art safety mechanism. Accordingly, it may be used in a number of different port applications, including applications in pick-up areas where the goods holder is directly handled by a customer. In addition and with reference to cut-out shown in FIG. 4, the hatch assembly 10 of the present invention has a simple design featuring a limited number of components, resulting in a small footprint. The hatch assembly 10 may be made movable, for instance by providing wheels 30 visible for instance in FIG. 7.

Figure 8:
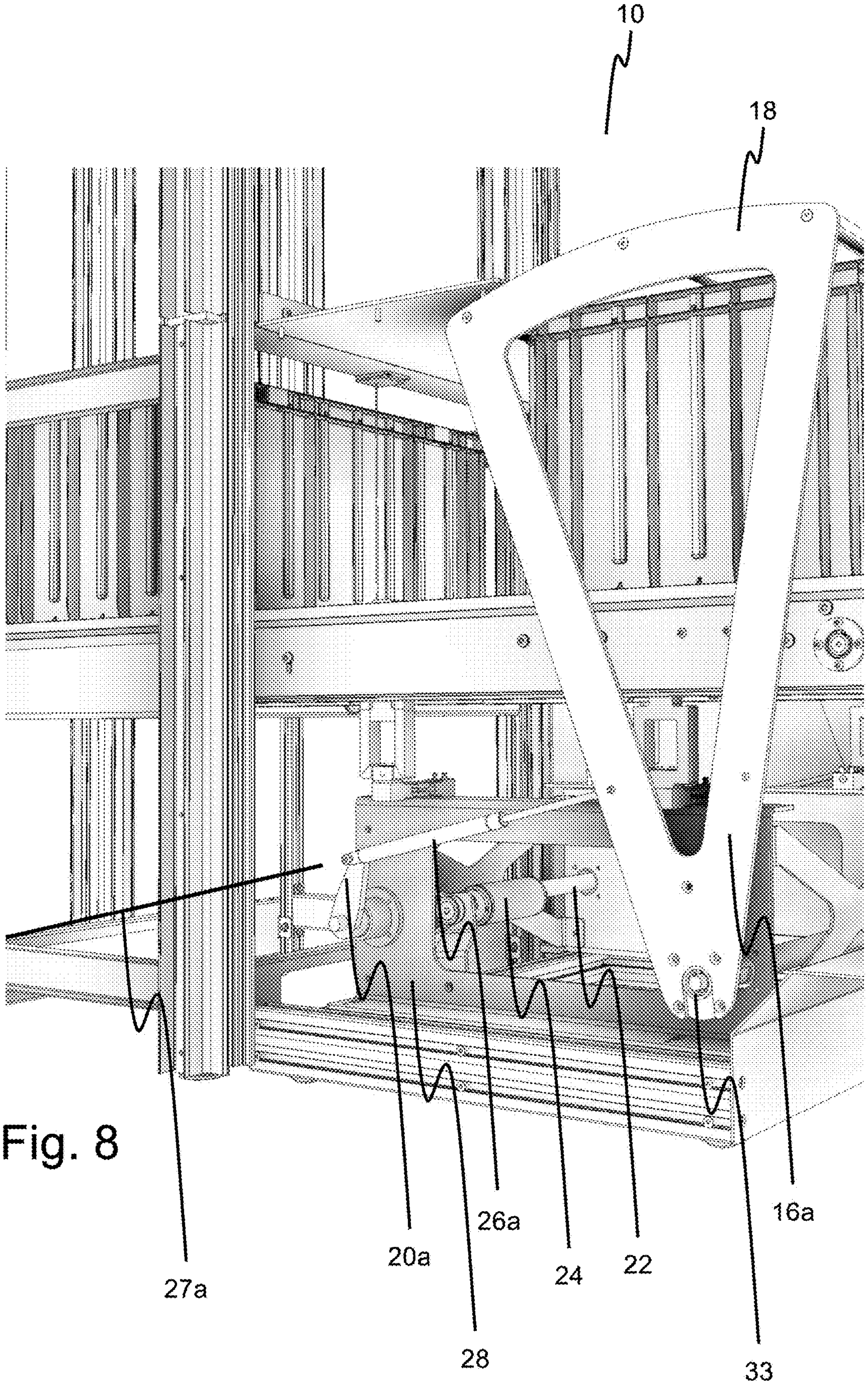
FIG. 8 is a close-up showing components of the hatch assembly in accordance with one embodiment of the present invention.

FIG. 8 is a close-up showing components of the hatch assembly 10 in accordance with one embodiment of the present invention. In this embodiment, the hatch frame comprises a pair of oppositely arranged hatch frame sections 16*a* (only one of these being clearly visible in FIG. 8). Each of these sections 16*a* is shaped as a sector of a circle. The hatch cover 18 is arranged between said frame sections 16*a* and is rigidly connected to said frame sections 16*a*. The hatch assembly 10 further comprises a pair of oppositely arranged, driven arms 20*a*, each connected to drive shaft 22 of driving means 24, and a pair of oppositely arranged links 26*a*, each link 26*a* having a first direction of extension 27*a* and linking the hatch frame section 16*a* with the thereto associated driven arm 20*a*. Each link 26*a* is rigidly connected to the hatch frame section 16*a* and flexibly connected to the pivotable arm 20*a*. Each link 26*a* has variable length in its first direction of extension 27*a*.

The assembly 10 further comprises a base frame 28 that supports the driven arm 20 and the driving means 24, said base frame 28 further comprising connection points 33 for the hatch frame 16. A horizontal pivot axis of the hatch frame 16 is disposed under access position associated with the goods holder (34; shown in FIG. 5). The assembly 10 in accordance with this embodiment can be retrofitted to an existing goods holder handling station at a port where health and safety requirements call for a guard structure to protect the operator. If required and for easier handling, such an assembly may be provided with wheels, for instance wheels 30 shown in FIG. 7.

Turning back to FIG. 5, the hatch cover 18 in the open state (FIG. 5) can block a further goods holder 109 positioned in a port column 37 from colliding with the goods holder 106 in the access position 34 associated with the goods holder while simultaneously allowing access to the goods holder in the access position. Hereby, an additional safety feature has been achieved. More specifically and still with reference to FIG. 5, an inadvertent translational movement of the further goods holder 109 towards the operator is dispersed by the hatch frame 16 in the open state and occupying a space 40 provided between the port column 37 and the access position 34 associated with the goods holder. Hereby, the force generated by the further goods holder 109 accidentally crashing into the hatch 14 is deflected towards the connection points 33 (shown in FIG. 8) of the hatch frame 16, thus protecting the operator.

In the preceding description, various aspects of the safety hatch, the port of a storage and retrieval system and the automated storage and retrieval system itself according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Storage and retrieval system
10 Hatch assembly
11 Side cover
12 Port
14 Hatch
16 Hatch frame
16*a* Hatch frame section
18 Hatch cover
20, 20*a* Arm
22 Drive shaft
24 Driving means
26, 26*a* Link
27, 27*a* First direction of extension
28 Base frame
30 Wheels
32 Cut-out
33 Connection points
34 Access position associated with the goods holder
36 Operator
37 Port column
40 Space
100 Framework structure 100
102 Upright members of framework structure
104 Storage grid
105 Storage column
106 Storage container
106' Particular position of storage container
107 Stack of storage containers
108 Rail system
109 Further goods holder
110 Parallel rails in first direction (X)
111 Parallel rails in second direction (Y)
112 Access opening
119 First port column
201 Container handling vehicle belonging to prior art
201*a* Vehicle body of the container handling vehicle 201
201*b* Drive means/wheel arrangement, first direction (X)
201*c* Drive means/wheel arrangement, second direction (Y)
301 Cantilever-based container handling vehicle belonging to prior art
301*a* Vehicle body of the container handling vehicle 301
301*b* Drive means in first direction (X)
301*c* Drive means in second direction (Y)
401 Container handling vehicle belonging to prior art
401*a* Vehicle body of the container handling vehicle 401
401*b* Drive means in first direction (X)
401*c* Drive means in second direction (Y)
X First direction
Y Second direction
Z Third direction

The invention claimed is:

1. A hatch assembly for a port of a storage and retrieval system for storing goods holders, said hatch assembly comprising:

a pivotable hatch comprising a hatch frame with a base, wherein the hatch frame is pivotable about a horizontal pivot axis at the base, and a hatch cover connected to the hatch frame, wherein said hatch cover can move in an arcuate manner for covering an open side of the goods holder, at least one driven arm rigidly connected to a drive shaft of driving means, at least one link for linking the pivotable hatch frame and the driven arm so that motion of the driven arm causes pivoting motion of the hatch, the link having a first direction of extension, said link being rigidly connected to the hatch frame and flexibly connected to the driven arm, wherein said link has variable length in the first direction of extension, and wherein length of the link is reduced once a forward pivotal movement of the hatch frame is discontinued.

2. The hatch assembly of claim 1, wherein the link and the driven arm are pivotally connected to each other.

3. The hatch assembly of claim 1, wherein the driven arm and the pivotable hatch frame pivot back and forth in a reciprocative manner in a shared plane.

4. The hatch assembly of claim 1, wherein the driven arm and the pivotable hatch frame always pivot in a shared direction.

5. The hatch assembly of claim 1, wherein an angular stroke of the driven arm is between 80 and 100 degrees.

6. The hatch assembly of claim 5, wherein the angular stroke of the driven arm is larger than an angular stroke of the pivotable hatch frame.

7. The hatch assembly of claim 1, wherein said link comprises a spring.

8. The hatch assembly of claim 7, wherein said spring is lockable.

9. The hatch assembly of claim 7, wherein said spring is a gas spring.

10. The hatch assembly of claim 9, wherein a threshold value for a force required to extend or compress the gas spring is in the range 50-150 Nm.

11. The hatch assembly of claim 1, wherein said hatch cover has curved shape having a first curvature.

12. The hatch assembly of claim 1, wherein said hatch assembly is provided with a sensor for monitoring position of the hatch cover.

13. The hatch assembly of claim 1, wherein said hatch assembly further comprises a base frame that supports the driven arm and the driving means, said base frame further comprising connection points for the hatch frame.

14. The hatch assembly of claim 13, wherein said base frame further comprises wheels so that the hatch assembly is movable.

15. The hatch assembly of claim 1, wherein a horizontal pivot axis of the hatch frame is disposed under access position associated with the goods holder.

16. The hatch assembly of claim 1, wherein pivoting of said hatch frame entails translatory movement of the hatch cover.

17. The hatch assembly of claim 1, wherein the hatch frame comprises a pair of oppositely arranged hatch frame sections, the hatch cover being arranged between said frame sections and being rigidly connected to said frame sections, wherein the at least one driven arm comprises a pair of oppositely arranged, driven arms, and wherein the at least one link comprises a pair of oppositely arranged links, each link of the pair of oppositely arranged links respectively linking each hatch frame section of the pair of oppositely arranged hatch frame sections with the thereto associated driven arm of the pair of driven arms.

18. The hatch assembly of claim 17, wherein the hatch frame section is shaped as a sector of a circle.

19. The hatch assembly of claim 17, said hatch assembly being substantially shaped as a parallelepiped, wherein a cut-out is provided at a lowermost portion of the hatch assembly, said cut-out further facing a hatch assembly operator.

20. A port of a storage and retrieval system for storing goods holders, said port comprising a hatch assembly comprising:

a pivotable hatch comprising a hatch frame with a base, wherein the hatch frame is pivotable about a horizontal pivot axis at the base, and a hatch cover connected to the hatch frame, wherein said hatch cover can move in an arcuate manner for covering an open side of the goods holder, at least one driven arm rigidly connected to a drive shaft of driving means, at least one link for linking the pivotable hatch frame and the driven arm so that motion of the driven arm causes pivoting motion of the hatch, the link having a first direction of extension, said link being rigidly connected to the hatch frame and flexibly connected to the driven arm, wherein said link has variable length in the first direction of extension, and wherein length of the link is reduced once a forward pivotal movement of the hatch frame is discontinued.

21. A method for controlling operation of a hatch assembly for a port of a storage and retrieval system for storing goods holders, said hatch assembly comprising a pivotable hatch comprising a pivotable hatch frame, a hatch cover connected to said hatch frame, a driven arm, and a link for linking the pivotable hatch frame and the driven arm so that motion of the driven arm causes pivoting motion of the hatch, said method comprising:

initiating size reduction of the link once forward pivotal movement of the hatch frame is discontinued.

* * * * *